US006779544B2

(12) United States Patent
Devall (10) Patent No.: US 6,779,544 B2
(45) Date of Patent: *Aug. 24, 2004

(54) TANK REFUELING SHUTOFF VALVE AND VENT SYSTEM (75) Inventor: Jeffrey E. Devall, Gwent (GB)

(73) Assignee: Stant Manufacturing Inc., Connersville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/087,328

(22) Filed: Mar. 1, 2002

(65) Prior Publication Data

US 2002/0121301 A1 Sep. 5, 2002

Related U.S. Application Data (60) Provisional application No. 60/273,074, filed on Mar. 2, 2001.

(51) Int. Cl.[7] .............................................. F16K 24/04
(52) U.S. Cl. ........................ 137/202; 137/43; 137/587; 251/901
(58) Field of Search ......................... 137/43, 202, 587; 251/901

(56) References Cited

U.S. PATENT DOCUMENTS

| 2,977,972 | A | * | 4/1961 | Billeter et al. ............... 137/202 |
| 5,234,013 | A | | 8/1993 | Roetker et al. |
| 5,277,217 | A | * | 1/1994 | Kobayashi et al. ......... 137/202 |
| 5,388,611 | A | | 2/1995 | Harris |
| 5,518,018 | A | | 5/1996 | Roetker |
| 5,535,772 | A | | 7/1996 | Roetker et al. |
| 5,582,198 | A | | 12/1996 | Nagino et al. |
| 5,603,349 | A | | 2/1997 | Harris |
| 5,666,989 | A | | 9/1997 | Roetker |
| 5,687,778 | A | | 11/1997 | Harris |
| 5,694,968 | A | | 12/1997 | Devall et al. |
| 5,755,248 | A | | 5/1998 | Szlaga et al. |
| 5,944,044 | A | | 8/1999 | King et al. |
| 6,003,499 | A | | 12/1999 | Devall et al. |
| 6,056,029 | A | | 5/2000 | Devall et al. |
| 6,062,276 | A | | 5/2000 | Benjey et al. |
| 6,170,510 | B1 | | 1/2001 | King et al. |
| 2002/0112757 | A1 | * | 8/2002 | DeCapua et al. ............ 137/202 |

FOREIGN PATENT DOCUMENTS

| EP | 0869022 A | 10/1998 |
| EP | 0976597 A | 2/2000 |

* cited by examiner

Primary Examiner—Gerald A. Michalsky
(74) Attorney, Agent, or Firm—Barnes & Thornburg (57) ABSTRACT A tank vent valve apparatus includes a valve housing formed to include an inlet port, an outlet port, and an interior region. The interior region is partitioned to define an intake chamber communicating with the inlet port, a discharge chamber communicating with the outlet port, and a float chamber containing a vent port valve and receiving liquid fuel and fuel vapor from the intake chamber. An interior wall defines a boundary between the float chamber and the discharge chamber and includes a valve seat formed to include a vent port therein. The vent port valve is buoyant and moves up and down along the interior wall as liquid fuel rises and falls in the float chamber to close and open the vent port.

19 Claims, 5 Drawing Sheets

TANK REFUELING SHUTOFF VALVE AND VENT SYSTEM

This application claims priority under 35 U.S.C. 119(e) to U.S. Provisional Application Serial No. 60/273,074, filed Mar. 2, 2001, which is expressly incorporated by reference herein.

BACKGROUND AND SUMMARY

The present disclosure relates to fuel tank vent valves, and particularly to venting apparatus which operates to seal the vapor space in the interior of a fuel tank at the completion of vehicle refueling to prevent the passage of liquid fuel outside the tank and during refueling and reopens at some point after refueling has been completed to vent the vapor space. More particularly, the present disclosure relates to a buoyant valve arranged to open and close a tank venting outlet passageway.

According to the present disclosure, a tank vent apparatus comprises a valve housing formed to include an interior region, an inlet port, and an outlet port and flow-control means for blocking discharge of fuel vapor admitted into the interior region from the valve housing through the outlet port in response to admission of a predetermined amount of liquid fuel into the interior region through the inlet port. The inlet port is adapted to receive liquid fuel and fuel vapor from a vehicle fuel tank. The outlet port is adapted to discharge pressurized fuel vapor to a fuel vapor treatment canister located outside the fuel tank.

In an illustrative embodiment, the flow-control means comprises a vertical interior wall including a valve seat formed to include a vent port and a vent port valve mounted for up and down movement in the interior region of the valve housing to close and open the vent port. The vent port valve includes a buoyant float located in the interior region of the valve housing to float up and down in liquid fuel admitted into the interior region through the inlet port and a seal coupled at one end to the float and at another end to the vertical interior wall at a point just below the valve seat.

In operation, when the tank vent apparatus is mounted inside a vehicle fuel tank, pressurized fuel vapor in the fuel tank normally passes from the tank into the interior region of the valve housing through the inlet port, through the opened vent port, out of the valve housing through the outlet port, and then on to a fuel vapor treatment canister located outside of the fuel tank. During such normal operation, there is little or no liquid fuel present in the interior region of the valve housing and the float remains in a lowered position pulling the seal downwardly away from the vent port to allow pressurized fuel vapor to flow "laterally" through the opened vent port en route to the outlet port.

During refueling, the level of liquid fuel will rise as more and more fuel is pumped into the fuel tank. Eventually, liquid fuel will pass into the interior region of the valve housing through the inlet port and raise the float in the interior region of the valve housing. Such upward movement of the float causes the seal to roll upwardly along the valve seat and close the vent port to block lateral flow of pressurized fuel vapor therethrough so that fuel vapor admitted into the interior region is not able to escape from the interior region through the outlet port.

In an illustrative embodiment, the valve housing includes a top wall adapted to be mounted to a top wall of a fuel tank, a bottom wall positioned to lie in spaced-apart relation to the top wall, and an outer side wall arranged to cooperate with the top and bottom walls to define the interior region. The inlet port is formed in the outer side wall and the outlet port is formed in the bottom wall. The vertical interior wall is cylinder-shaped and coupled to the bottom wall at the outlet port and oriented to extend upwardly toward the top wall so that the vent port is located near to the top wall. The float is ring-shaped and surrounds the cylinder-shaped vertical interior wall. The seal includes a base coupled to the float, a lip coupled to the vertical interior wall, and a pliable annular membrane arranged to interconnect the base and the lip and configured to surround the cylinder-shaped interior wall.

Additional features of the present disclosure will become apparent to those skilled in the art upon consideration of the following detailed description of illustrative embodiments exemplifying the best mode of carrying out the present disclosure as presently perceived.

BRIEF DESCRIPTION OF THE DRAWINGS

The detailed description particularly refers to the accompanying figures in which:

FIG. 2 is a sectional view taken along line 2—2 of FIG. 1 showing a buoyant vent port valve arranged to move up and down inside a valve housing included in the valve unit to open and close vent ports formed in a cylinder-shaped interior wall mounted in the valve housing as the level of liquid fuel changes inside the valve housing to allow pressurized fuel vapor to flow through an outlet port formed in the bottom wall of the valve housing into the discharge conduit when the vent port valve is moved downwardly to open the vent ports and showing a vent unit comprising a bleed passageway and a head valve arranged inside the valve housing to regulate flow of pressurized fuel vapor from the tank into an upper interior region of the valve housing so as to facilitate fuel vapor venting after refueling when the tank is still full or nearly full;

FIG. 5 is a sectional view similar to FIG. 4 a short time after refueling is over showing that pressurized fuel vapor has passed through a bleed passageway into an upper interior region of the valve housing causing the pressure in that region to rise to a level sufficient to force liquid fuel out of the lower interior region and back into the tank (through the transfer conduit and the remote fuel and vapor inlet unit)

to allow the spring-biased float to move downwardly in the valve housing, thereby moving the rolling seal downwardly to reopen the vent ports so that pressurized fuel vapor can flow from the tank to the canister through the valve unit and the discharge conduit;

DETAILED DESCRIPTION OF THE DRAWINGS

A vent apparatus 10 is provided in fuel tank 12 to vent fuel vapor from tank 12 to a fuel vapor treatment canister 14 or other destination outside tank 12. Vent apparatus 10 includes a valve unit 16, a discharge conduit 18 conducting fuel vapor from valve unit 16 to fuel vapor treatment canister 14, and a remote (fuel and vapor) inlet unit 22 coupled to valve unit 16 by a transfer conduit 24. Transfer conduit 24 conducts both liquid fuel and fuel vapor from tank 12 to valve unit 16.

Figure 1:
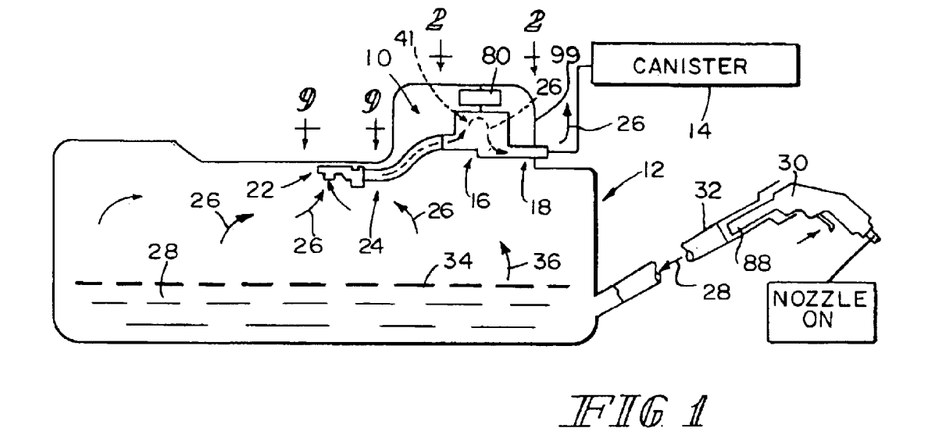
FIG. 1 is a diagrammatic view of a fuel tank during refueling showing vent apparatus mounted in an upper interior region of the fuel tank and configured to include a valve unit coupled to the top wall of the fuel tank and arranged to discharge pressurized fuel vapor from the tank through a discharge conduit passing through a side wall of the tank and showing a remote fuel and vapor inlet unit located in a central interior region of the fuel tank below the valve unit and coupled to the valve unit by a transfer conduit.
Figure 2:
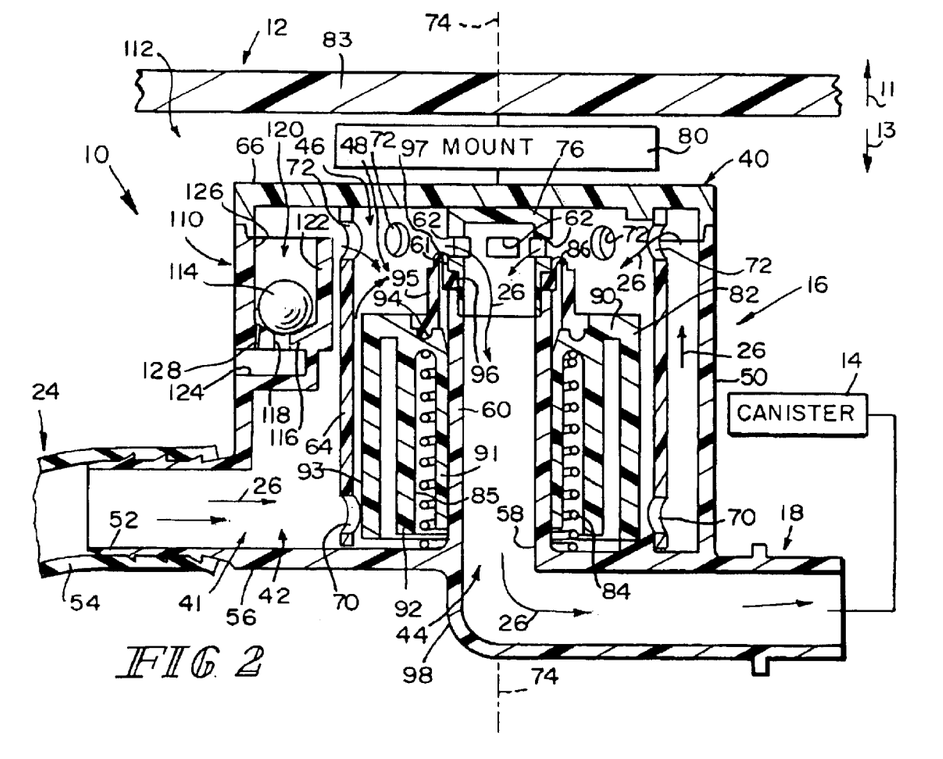
Figure 3:
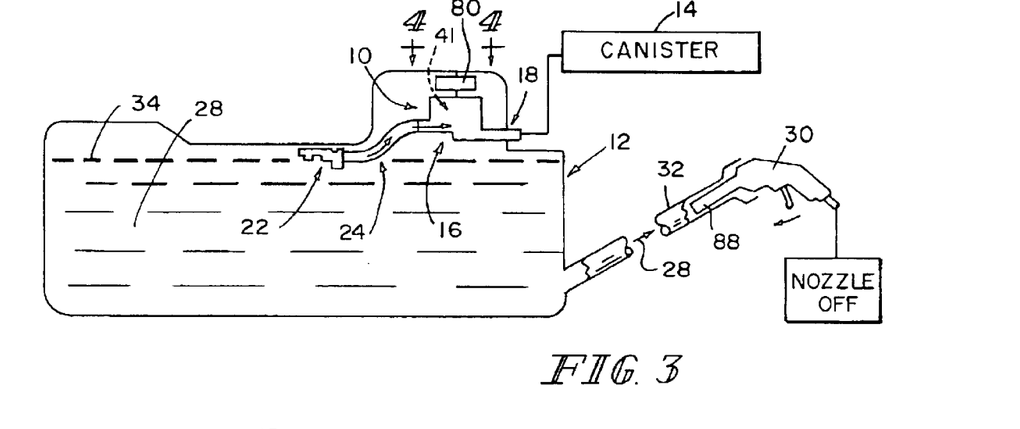
FIG. 3 is a diagrammatic view similar to FIG. 1 after refueling showing that no fuel vapor is venting from the fuel tank to the canister through the valve unit and discharge conduit and showing that liquid fuel backs up through the filler neck to reach a fill-limiting sensor on a fuel-dispensing pump nozzle inserted into a tank filler neck to shut off further fuel flow from the pump nozzle into the tank.
Figure 4:
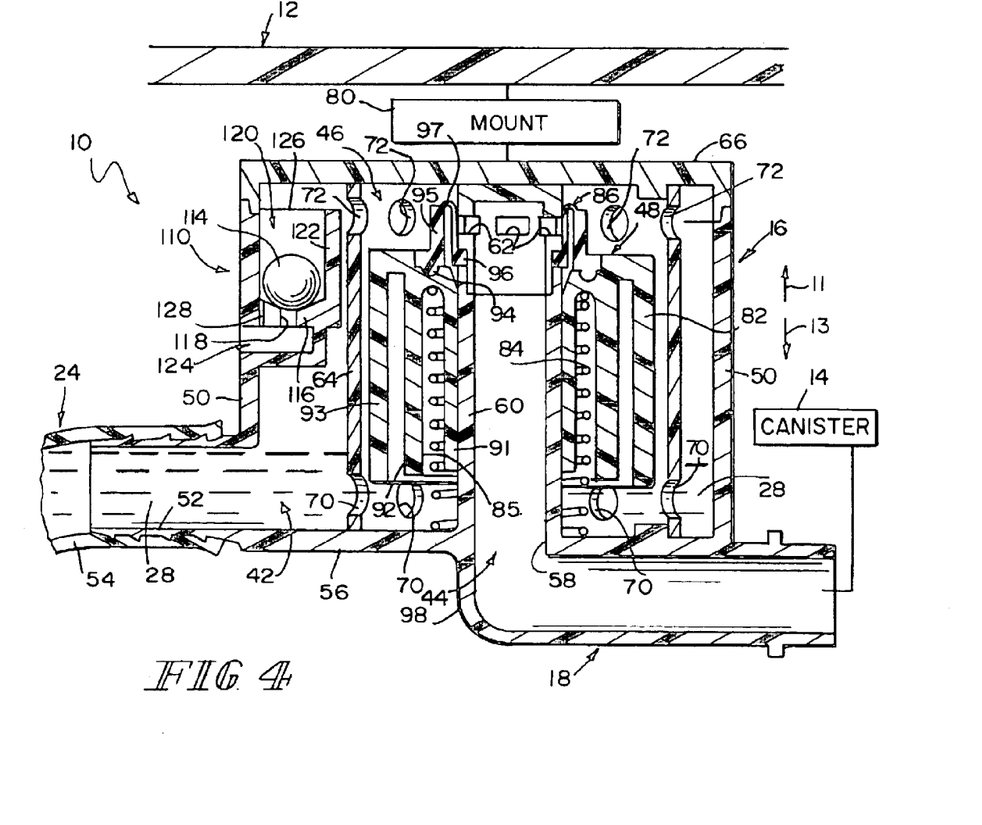
FIG. 4 is a sectional view taken along line 4—4 of FIG. 3 showing that liquid fuel in the tank has passed into a lower region of the valve housing (through the remote fuel and vapor inlet unit and the transfer conduit) to raise a spring-biased float upwardly causing a rolling seal coupled to the float to close the vent ports, thereby blocking flow of liquid fuel and fuel vapor from the tank to the canister through the valve unit.

During normal vehicle operation and early stages of tank refueling, pressurized fuel vapor 26 extant in tank 12 flows to canister 14 through, in sequence, remote inlet unit 22, transfer conduit 24, valve unit 16, and discharge conduit 18 as shown, for example, in FIGS. 1 and 2. During later stages of tank refueling, liquid fuel 28 travels into valve unit 16 through remote inlet unit 22 and transfer conduit 24 to reach and operate a buoyant vent port valve 48 contained in valve unit 16 and arranged to move therein in response to rising and falling levels of liquid fuel in valve unit 16 to close and open discharge conduit 18 as shown, for example, in FIGS. 3–6.

Fuel vapor treatment canister 14 is designed to capture and store fuel vapors that are displaced and generated in fuel tank 12 during a typical vehicle refueling operation. A fuel-dispensing pump nozzle 30 is inserted into an open mouth in tank filler neck 32 during refueling as shown, for example, in FIGS. 1 and 3. As tank 12 is filled during refueling, the top surface 34 of liquid fuel 28 in tank 12 will rise in direction 36 as shown in FIG. 1.

Valve unit 16 includes a valve housing 40 having an interior region 41 that is partitioned to include an intake chamber 42 arranged to receive either liquid fuel 28 or fuel vapor 26 exhausted by transfer conduit 24, a discharge chamber 44 communicating with discharge conduit 18, and a float chamber 46 interposed between and in fluid communication with the intake and discharge chambers 42, 44. A buoyant vent port valve 48 moves up and down in float chamber 46 in response to rising and falling levels of liquid fuel 28 in float chamber 26 so that pressurized fuel vapor 26 admitted from tank 12 into float chamber 46 is either blocked from passing to canister 14 through discharge chamber 44 or passed to canister 14 through discharge chamber 44 and discharge conduit 18.

Valve housing 40 is formed to include an inlet port 52, an outlet port 58, and an interior region 41 arranged to receive fuel vapor 26 admitted into valve housing 40 through inlet port and to communicate fuel vapor 26 to outlet port 58 for discharge from valve housing 40 as shown, for example, in FIG. 2. In the illustrated embodiment, valve housing 40 includes a top wall 66 adapted to be mounted to a top wall 83 of fuel tank 12, a bottom wall 56 positioned to lie in spaced-apart relation to top wall 66, and an outer side wall 50 arranged to extend from top wall 66 to bottom wall 56 to define the interior region 41 therebetween. In the illustrated embodiment, outer side wall 50 is formed to include inlet port 52 and bottom wall 56 is formed to include outlet port 58. Inlet port 52 is coupled to an outlet 54 of transfer conduit 24 and outlet port 58 is coupled to discharge conduit 18 to place discharge chamber 44 in fluid communication with discharge conduit 18 as shown, for example, in FIG. 2.

A partition is located in valve housing 40 to divide interior region 41 into an upstream passageway 42, 46 arranged to receive liquid fuel 28 and fuel vapor 26 admitted into interior region 41 through inlet port 52 and a discharge chamber 44 arranged to discharge fuel vapor 26 from interior region 41 through outlet port 58. The partition includes an upright cylinder-shaped interior wall 60 that is configured to provide a valve seat 61 located in the float chamber "portion" 46 of upstream passageway 42, 46 and formed to include at least one vent port 62 configured to communicate fuel vapor 26 from upstream passageway 42, 46 into discharge passageway 44. Interior wall 60 is coupled to bottom wall 56 of valve housing 40 at outlet port 58 to allow fuel vapor 26 to flow from discharge chamber 44 into discharge conduit 18. Vent ports 62 are spaced apart from one another about the circumference of cylinder-shaped interior wall 60 and arranged to communicate pressurized fuel vapor 26 extant in float chamber 46 into discharge chamber 44 as long as vent ports 62 are not closed by raised buoyant vent port valve 48 as shown, for example, in FIG. 4. Cylinder-shaped interior wall 60 defines an outer boundary of discharge chamber 44.

An interior sleeve 64 is located in interior region 41 of valve housing 40 to surround upright interior wall 60. Interior sleeve 64 is positioned to divide upstream passageway 42, 46 into an intake chamber 42 arranged to receive liquid fuel 28 and fuel vapor 26 admitted into interior region 41 through inlet port 52 and a float chamber 46 containing buoyant vent port valve 48 as shown, for example, in FIG. 2.

It is within the scope of this disclosure to provide chambers 42, 44, and 46 in a variety of different locations relative to one another both inside and outside a housing boundary. Depending upon venting needs and space constraints with a fuel tank, the walls forming and separating these chambers can assume any number of shapes and sizes.

Referring to FIG. 2, interior sleeve 64 is formed to include several lower fuel ports 70 to provide means for conducting liquid fuel 28 from intake chamber 42 into a lower region of float chamber 46 whenever liquid fuel 28 is passed from tank 12 into intake chamber 42 through remote inlet unit 22 and transfer conduit 24. Interior sleeve 64 is also formed to include several upper vapor ports 72 to provide means for conducting pressurized fuel vapor 26 extant in intake chamber 42 into an upper region of float chamber 46. In the embodiment illustrated in FIG. 2, lower fuel ports 70 are located near bottom wall 56 of valve housing 40 and upper vapor ports 72 are located near top wall 66 of valve housing 40. Lower fuel ports 70 are formed in interior sleeve 64 to lie in circumferentially spaced-apart relation to one another as are the upper vapor ports 72.

In the illustrated embodiment, valve housing 40 has a central vertical axis 74 as suggested in FIG. 2, which axis 74 is arranged to intersect top and bottom walls 66, 56 of valve housing 40. Each of the interior wall 60, interior sleeve 64, and outer side wall 50 has a cylindrical shape and a central vertical axis that is coextensive with central vertical axis 74. This arrangement causes discharge chamber 44 to extend vertically along central vertical axis 74 and have an inlet end formed to lie near top wall 66 and an outlet end established in bottom wall 56 at opening 58. Float chamber 46 provides a deep "ring-shaped" canyon around the "shaft-like" discharge chamber 44 to contain buoyant vent port valve 48 therein. Intake chamber 42 provides a deep ring-shaped canyon around the float chamber 46.

A cap 76 is appended to an upper end of inner cylindrical wall 60 to provide a ceiling for discharge chamber 44 as shown, for example, in FIG. 2. Cap 76 is positioned to abut a central region of an interior surface of top wall 66 in the illustrated embodiment.

Mount 80 is provided to support valve housing 40 in fuel tank 12. It is within the scope of this disclosure to configure mount 80 so that top wall 66 is spaced away from or made a part of the top wall 83 of fuel tank 12. During installation, valve housing 40 and other components included in vent apparatus 10 will be passed through a hole (not shown) that has been formed in fuel tank 12. The hole will later be covered up, leaving mount 80 to hold vent apparatus 10 in a fixed position inside fuel tank 12.

Buoyant vent port valve 48 is made to move up and down in the ring-shaped float chamber 46 formed in valve housing 40 as the level of liquid fuel 28 rises and falls in float chamber 46. Vent port valve 48 is mounted for movement in float chamber 46 in an axially upward direction 11 to a closed position (shown in FIG. 4) engaging the valve seat 61 provided on interior wall 60 around vent ports 62 and closing the vent ports 62. Vent port valve 48 is also movable in an axially downward direction 13 to an opened position (shown in FIG. 6) disengaging at least a portion of valve seat 61 and opening vent ports 62 to allow fuel vapor 26 to flow in radial directions (i.e., directions generally "perpendicular" to central vertical axis 74) through vent ports 62 from the upstream passageway 42, 46 into discharge chamber 44 to be discharged from interior region 41 through outlet port 58. As shown, for example, in FIG. 2, buoyant vent port valve 48 includes a float 82, a compression spring 84 for lifting float 82, and an annular "rolling" seal 86 for closing vent ports 62 formed in interior wall 60.

Rolling seal 86 is coupled at one end to a top portion of float 82 to move therewith and at another end to the relatively immovable interior wall 60. As shown, for example, in FIG. 2, when little or no liquid fuel 28 is extant in a lower interior region of float chamber 46, float 82 moves to assume a lowered position in float chamber 46 "pulling" rolling seal 86 to a retracted position "opening" vent ports 62 so that pressurized fuel vapor 26 is free to flow from an upper interior region of float chamber 46 through vent ports 62 into discharge chamber 44 en route to fuel vapor treatment canister 14 through discharge conduit 18. As shown, for example, in FIG. 4, when liquid fuel 28 fills the lower interior region of float chamber 46 during tank refueling, float 82 moves upwardly to assume a raised position in float chamber 46 pulling rolling seal 86 to an extended position engaging valve seat 61 and "closing" vent ports 62 so that pressurized fuel vapor 26 in float chamber 46 is blocked from flowing into discharge chamber 44 through vent ports 62. At this stage of refueling, because pressurized fuel vapor 26 extant in tank 12 is unable to vent to canister 14 through discharge conduit 18, the pressure inside tank 12 will rise sharply to exceed the pressure of liquid fuel 28 flowing into tank 12 through filler neck 32 causing liquid fuel flow in filler neck 32 to slow or "hesitate" and splash a fill limit sensor 88 on pump nozzle 30 to shut off fuel flow from nozzle 30.

Compression spring 84 acts between bottom wall 56 of valve housing 40 and an upper portion of float 82 to assist in lifting float 82 within float chamber 46 as the fuel level therein rises during refueling. In the illustrated embodiment, spring 84 is a coiled compression spring arranged to extend into a downwardly opening, ring-like space 85 formed in float 82. As shown in FIG. 2, float 82 is ring-shaped and includes a top wall 90 and three sleeves 91, 92, 93 depending from top wall 90 and arranged in concentric relation to one another so as to provide the ring-like space 85 receiving spring 84 between the radially innermost sleeve 91 (that is arranged to lie next to inner cylindrical wall 60) and a middle sleeve 92 extending around the radially innermost sleeve 91.

Rolling seal 86 includes a base 94 anchored to top wall 90 of float 82 and formed to include an upright sleeve 95 projecting upwardly from the base 94 and arranged to surround an upper portion of interior wall 60, a lip 96 anchored to interior wall 60 at a location below and in somewhat close proximity to the lower edge of vent ports 62, and a pliable annular membrane 97 having one edge appended to the upright sleeve 95 of base 94 and an opposite edge appended to the lip 96. The pliable annular membrane 97 "rolls back and forth" as float 82 is raised and lowered in a rising and falling pool of liquid fuel 28 extant in a lower interior region of float chamber 46 to establish means for opening vent ports 62 as shown, for example, in FIG. 2 and means for closing vent ports 62 as shown, for example, in FIG. 4.

In the illustrated embodiment, an inlet portion 98 of discharge conduit 18 is coupled to valve housing 40 to receive pressurized fuel vapor 26 discharged from discharge chamber 44 through outlet port 58 formed in bottom wall 56 of valve housing 40 so as to provide a "bottom-discharge" valve unit 16. Such a valve unit can be provided with a relatively flat top wall to facilitate mounting the mounting unit in, on, or near the top wall of the fuel tank which contains the valve unit.

Discharge conduit 18 is arranged to exit fuel tank 12 through an aperture formed in a side wall (such as wall 99)

of the fuel tank 12 as shown, for example, in FIG. 1. Such a "side-mounted" discharge conduit also functions to facilitate mounting valve unit 16 in, on, or near the top wall of the fuel tank which contains valve unit 16. It is also within the scope of this disclosure to mount discharge conduit 18 so that it exits through a top or bottom wall of a fuel tank.

A vent unit 110 is located in an upper interior region of intake chamber 42 (as shown, for example, in FIG. 2) to admit pressurized fuel vapor 26 into that chamber 42 in a regulated manner so as to facilitate venting pressurized fuel vapor from the vapor space 112 under top wall 82 of tank 12 when tank 12 is full or nearly full. Although vent unit 110 is mounted inside valve housing 40 in the illustrated embodiment, it is within the scope of this disclosure to locate vent unit 110 outside valve housing 40 and use hoses or other fuel vapor conductors (not shown) to transport fuel vapor from such a remote vent unit into the intake chamber 42 formed in valve housing 40. In the illustrative embodiment, vent unit 110 is configured to provide vent means for admitting fuel vapor 26 into upstream passageway 42, 46 through inlet port 52 when liquid fuel 28 admitted into upstream passageway 42, 46 through inlet port 52 rises to a level in upstream passageway 42, 46 to occlude inlet port 52 and block passage of fuel vapor 26 therethrough so that fuel vapor 26 continues to be admitted into upstream passageway 42, 46 for delivery to discharge chamber 44 when vent port valve 48 is moved to assume the opened position.

Vent unit 110 includes a movable head valve 114 normally at rest on a valve seat 116 formed to include a vent passageway 118 to close vent passageway 118. Head valve 114 remains in a valve chamber 120 defined by a cylinder-shaped wall 122 rising up from valve seat 116 as shown, for example, in FIG. 2. Vent unit 110 includes an inlet channel 124 having an opening formed in outer side wall 50 and communicating with vent passageway 118 formed in valve seat 116. An upper portion of cylinder-shaped wall 122 is formed to provide an opening 126 so that pressurized fuel vapor 26 extant in valve chamber 120 is free to pass into intake chamber 42 on its way to fuel vapor treatment canister 14 through upper vapor ports 72, float chamber 46, vent ports 62, discharge chamber 44, and discharge conduit 18.

Vent unit 110 further includes a bleed passageway 128 formed in or near valve seat 116 (or other suitable location in vent unit 110 or outer side wall 50) to meter a flow of pressurized fuel vapor 26 from inlet channel 124 into valve chamber 120 continuously, regardless of whether head valve 114 is positioned to open or close vent passageway 118 formed in valve seat 116. In the illustrated embodiment, the upwardly facing surface supporting head valve 114 in its closed position has a conical shape. Bleed passageway 128 functions, for example, to admit pressurized fuel vapor 26 into the upper interior region of float chamber 46 once the fuel tank 12 is full and refueling has been completed to help change the pressure level in float chamber 46 so as to "force" all or most of liquid fuel 28 out of the lower interior region of float chamber 46, allowing float 82 to sink and pull at least a portion of rolling seal 86 away from its closed position (as shown, for example, in FIG. 5) so that pressurized fuel vapor 26 from the tank 12 and in float chamber 46 can begin to vent to fuel vapor treatment canister 14 through vent ports 62, discharge chamber 44, and discharge conduit 18. Bleed passageway 128 is sized to provide adequate venting for fuel tank 12 and still block overfilling of tank 12 during refueling. If pressure in tank 12 rises too high, then head valve 114 can move upwardly allowing higher flow.

Figure 9:
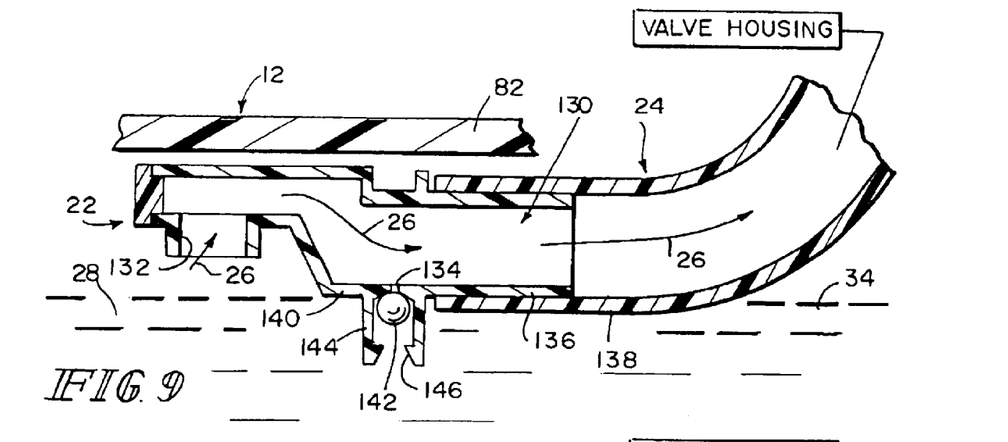
FIG. 9 is an enlarged sectional view taken along line 9—9 of FIG. 1 at a high level of liquid fuel in the tank showing pressurized fuel vapor venting from the tank to the valve housing through the remote fuel and vapor inlet unit and the transfer conduit and showing closure of an inlet unit drain by a remote buoyant drain closure trapped in a cage (appended to the remote inlet unit) and raised upwardly by liquid fuel extant in the cage to close a drain port formed in a floor of the remote inlet unit.
Figure 10:
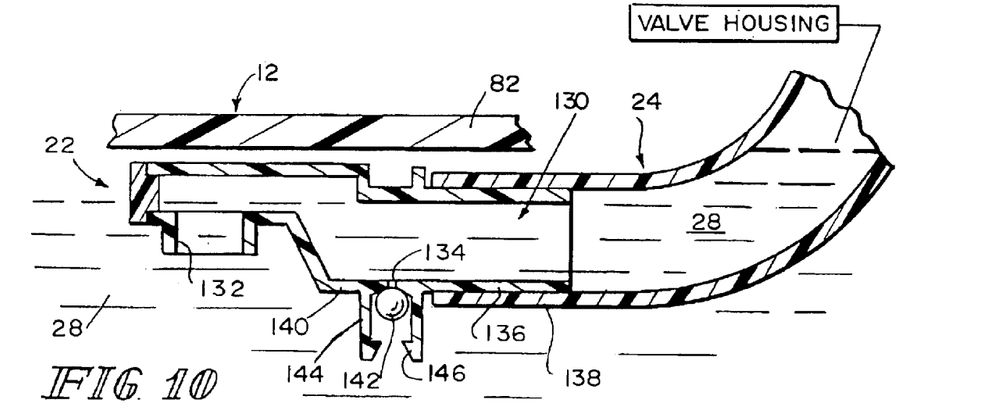
FIG. 10 is a sectional view similar to FIG. 9 showing presence of liquid fuel in the remote inlet unit and the transfer conduit during refueling (see, for example, FIGS. 3 and 4) while the drain port in the floor is closed by the buoyant drain closure.
Figure 11:
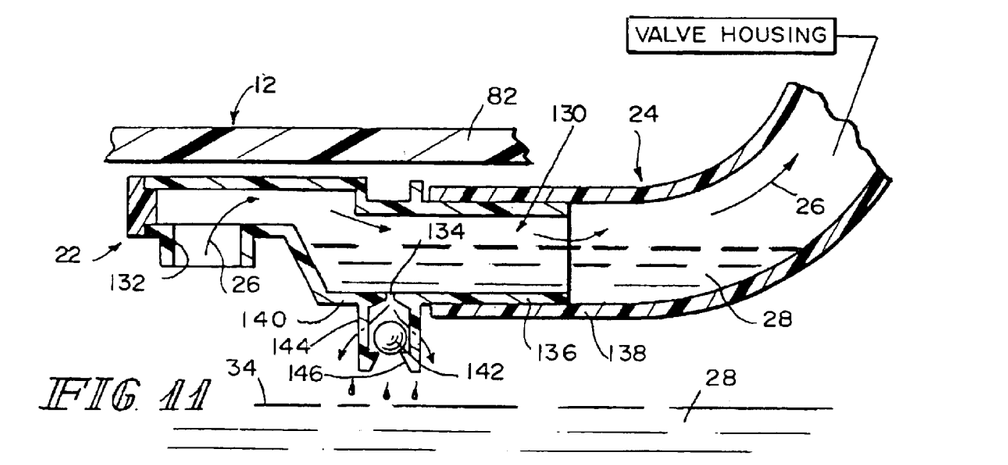
FIG. 11 is a sectional view similar to FIGS. 9 and 10 after the level of liquid fuel in the tank has lowered showing movement of the buoyant drain closure downwardly to an opened position in the cage to open the drain port in the floor so that any residual liquid fuel in the remote inlet unit flows back into the fuel tank prior to the next tank refueling activity.

The remote inlet unit 22 shown in FIG. 1 is shown in greater detail and in operation in FIGS. 9–11. Remote inlet unit 22 is formed to include an inlet chamber 130, an inlet port 132 communicating with inlet chamber 130, a drain port 134 communicating with inlet chamber 130, and an outlet 136 coupled to an inlet 138 of transfer conduit 24 so that liquid fuel and fuel vapor can flow freely between inlet chamber 130 and transfer conduit 24 as shown, for example, in FIGS. 9–11. Inlet unit 22 includes a floor 140 located to provide a lower boundary of inlet chamber 130 and formed to include drain port 134 to facilitate drainage of liquid fuel 28 from inlet chamber 130. It is within the scope of this disclosure to form a 90° bend (or other bend) in transfer conduit 24 and arrange transfer conduit 24 so that its inlet opening faces downwardly toward the floor of tank 12 as an alternative to the use of a separate remote inlet unit 22.

A buoyant drain closure 142 is trapped in a cage 144 that depends from floor 140 of inlet unit 22 and extends around and below drain port 134. Buoyant drain closure 142 is configured to float in liquid fuel 28 so that it can rise upwardly to engage a valve seat surrounding drain port 134 to close drain port 134 as shown, for example, in FIGS. 9 and 10 whenever the level of fuel 28 in tank 12 is high enough. Later, after the level of fuel 28 drops to a predetermined height below remote inlet unit 22 as shown in FIG. 11, buoyant drain closure 142 falls downwardly away from drain port 134 to rest on support flanges 146 provided on cage 144 so that any residual liquid fuel 28 in inlet chamber 130 can drain out of inlet chamber 130 into tank 12 through drain port 134 and cage 144. Drain port 134 is formed in a low spot of remote inlet unit 22 so that unit 22 is drained to remove a restriction trapped fuel would cause on next refueling.

In operation, pump nozzle 30 is operated to begin dispensing liquid fuel 28 into tank 12 through filler neck 32 at the beginning of a tank refueling cycle. Pressurized fuel vapor 26 extant in tank 12 flows to fuel vapor treatment canister 14 through remote inlet unit 22, transfer conduit 24, valve unit 16, and discharge conduit 18 as shown, for example, in FIGS. 1 and 2. Later in the tank refueling cycle, liquid fuel 28 will enter remote inlet unit 22 through inlet port 134 and pass into a lower interior region of float chamber 46 through transfer conduit 24 and intake chamber 42. As the level of liquid fuel 28 in float chamber 46 rises, float 82 will also rise to move rolling seal 86 to a position closing vent ports 62 as shown, for example, in FIG. 4 so that any further flow of pressurized fuel vapor 26 from tank 12 to fuel vapor treatment canister 14 is blocked. This will lead to "automatic" shutoff of pump nozzle 30 (shown in FIG. 3) in the well-known manner hereinbefore described.

Venting of pressurized fuel vapor 26 from tank 12 to fuel vapor treatment canister 14 can occur in two stages after tank refueling has been completed. The first stage is illustrated in FIG. 5 and the second stage is illustrated in FIG. 6.

Figure 5:
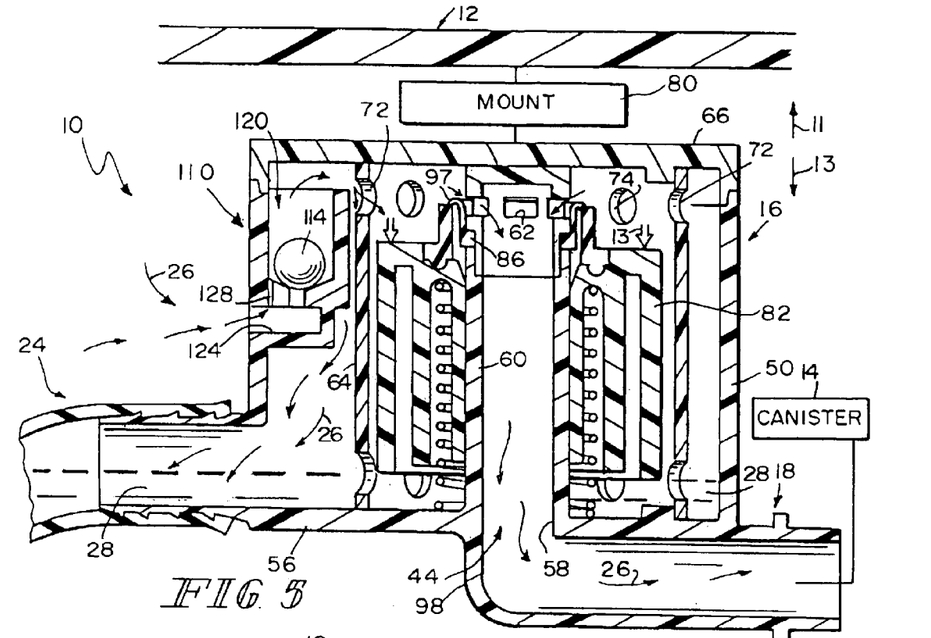

In a first stage illustrated in FIG. 5, pressurized fuel vapor 26 passes through bleed passageway 128 in vent unit 110 and travels through vent chamber 120 and upper vapor ports 72 to reach the upper interior region of float chamber 46. At this stage, some liquid fuel 28 is held up (i.e., pooled) in lower regions of intake chamber 42 and float chamber 46 because there is pressure in the tank vapor space 112 acting on fuel surface 34 in tank 12. The liquid fuel 28 extant in those chambers 42, 46 (and shown in FIG. 5) is acted on by pressure extant in those chambers 42, 46. That pressure is somewhat lower than tank pressure because those chambers 42, 46 have been exposed to atmospheric pressure via vent ports 62, discharge chamber 44, discharge conduit 18, and fuel vapor treatment canister 14 (which is open to the atmosphere) up to the point at which float 82 moved rolling seal 86 to close vent ports 62.

Now, the higher tank pressure outside of valve housing 40 starts to bleed into valve housing 40 through inlet channel 124 and bleed passageway 128 and past head valve 114 to reach inlet chamber 42 and float chamber 46. The volume of fuel vapor 26 admitted into fixed volume defined in chambers 42, 46 increases so the pressure in that region rises as well. This means that the pressure differential that was holding liquid fuel 28 in lower interior regions of chambers 42, 46 drops and therefore the fuel level in those regions drops. This allows float 82 to drop and rolling seal 86 to move to at least partly open vent ports 62 (although this may cause the pressure to drop again and fuel to return, eventually the pressures balance with vent ports 62 open and liquid fuel 28 fully drained from chambers 42, 46), thereby venting fuel vapor 26 in tank 12 to canister 14.

Figure 6:
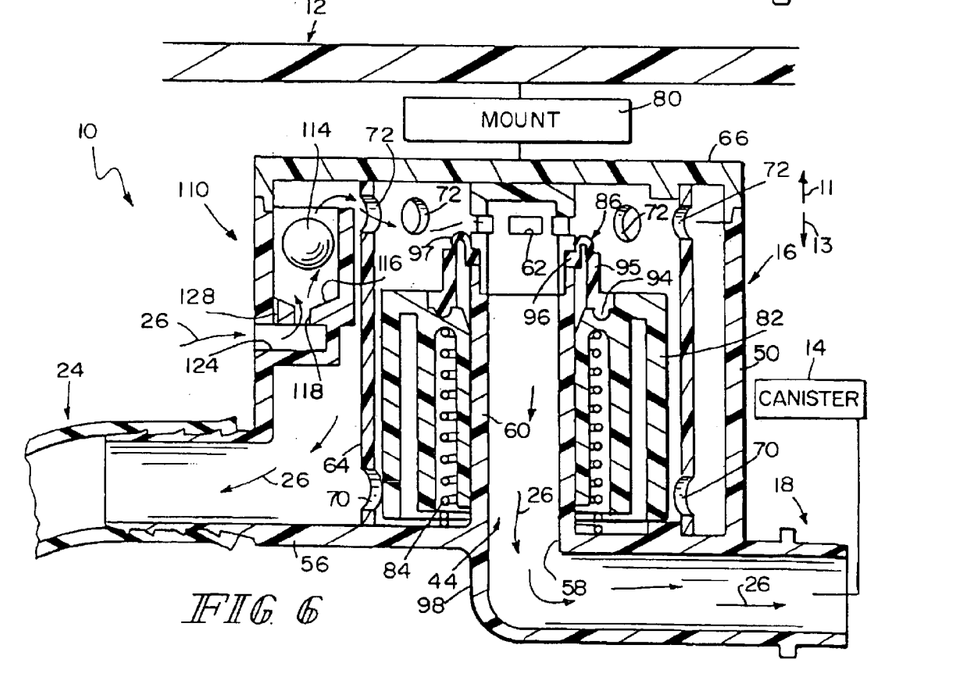
FIG. 6 is a sectional view similar to FIGS. 4 and 5 showing high-volume tank venting just after refueling due to operation of a movable head valve included in the vent unit to cause more pressurized fuel vapor to flow from the tank into the upper interior region of the valve housing than can flow into that region only through the bleed passageway.

In a second stage illustrated in FIG. 6, the fuel vapor pressure extant in tank 12 and applied to head valve 114 through inlet channel 124 and vent passageway 118 is high enough to lift head valve 114 away from its position on the underlying valve seat 116 closing vent passageway 118. Fuel vapor 26 is now free to pass into vent chamber 120 through vent passageway 118 in addition to bleed passageway 128. This vented fuel vapor is then conducted through valve housing 40 to fuel vapor treatment canister 14.

Figure 7:
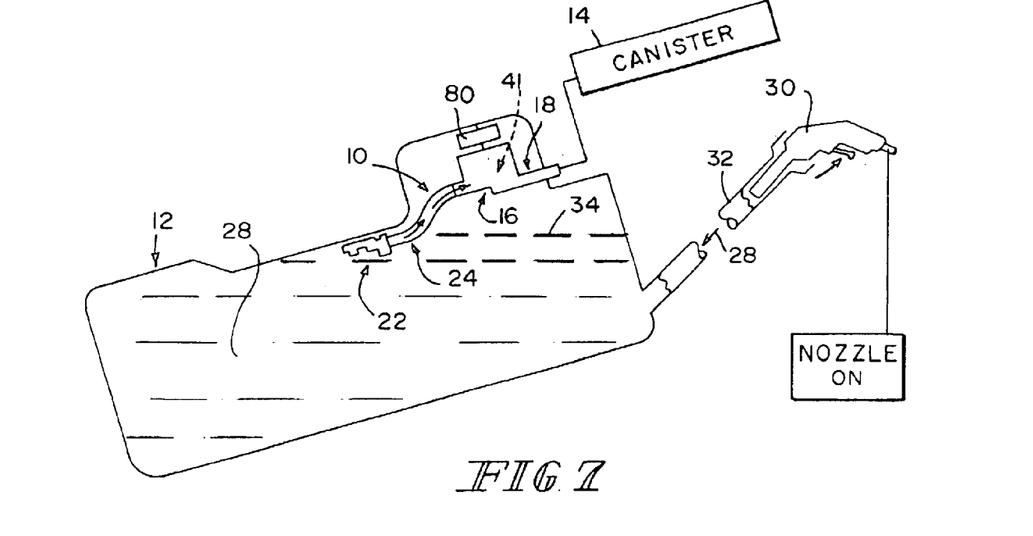
FIG. 7 is a diagrammatic view similar to FIG. 1 during refueling showing an inclined fuel tank sloping in a "positive" direction and illustrating use of the remote fuel and vapor inlet unit to reach liquid fuel in an inclined tank and transfer that fuel to the valve housing located above the remote inlet unit through the transfer conduit.
Figure 8:
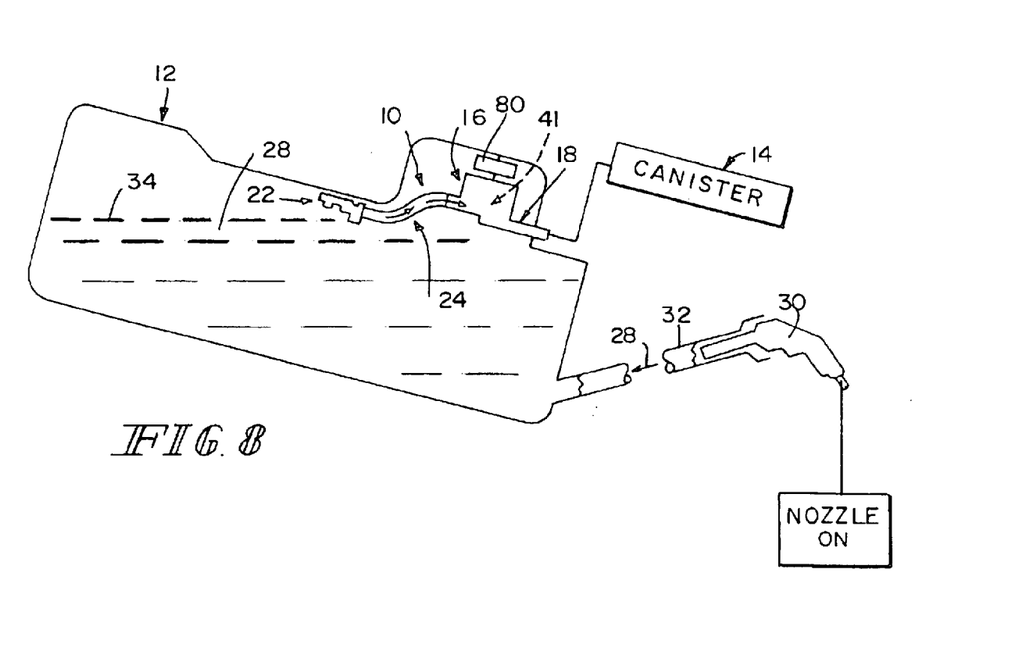
FIG. 8 is a diagrammatic view similar to FIG. 7 during refueling showing an inclined fuel tank sloping in a "negative" direction and liquid fuel being communicated to the valve housing through the remote fuel and vapor inlet unit.

Because fuel vapor 26 and liquid fuel 28 must first pass through remote inlet unit 22 and transfer conduit 24 to reach vent unit 16, it is necessary only to mount remote inlet unit 22 in a position where it is exposed to fuel vapor 26 and liquid fuel 28 at the proper stage during a tank refueling cycle. Thus, tank designers and manufacturers are free to mount valve unit 16 in higher elevation regions of tank 12 where valve unit 16 itself might not be exposed to liquid fuel 28 during refueling. It is within the scope of this disclosure to position and support remote inlet unit 22 in any suitable location within fuel tank 12. By locating remote inlet unit 22 at a lower elevation than valve unit and in a "center" portion of tank 12, remote inlet unit 22 is "exposed" to liquid fuel 28 in tank 12 during refueling even if tank 12 is inclined to slope in positively or negatively sloping directions as shown, for example, in FIGS. 7 and 8.

What is claimed is:

1. A tank vent apparatus comprising a valve housing formed to include an inlet port, an outlet port, and an interior region arranged to receive fuel vapor admitted into the valve housing through the inlet port and to communicate fuel vapor to the outlet port for discharge from the valve housing, a partition located in the valve housing to divide the interior region into an upstream passageway arranged to receive liquid fuel and fuel vapor admitted into the interior region through the inlet port and a discharge chamber arranged to discharge fuel vapor from the interior region through the outlet port, the partition including an upright interior wall providing a valve seat located in the upstream passageway and formed to include at least one vent port configured to communicate fuel vapor from the upstream passageway into the discharge chamber, and a vent port valve mounted for movement in the upstream passageway in an axially upward direction to a closed position engaging the valve seat and closing the at least one vent port and in an axially downward direction to an opened position disengaging at least a portion of the valve seat and opening the vent port to allow fuel vapor to flow in a radial direction through the vent port from the upstream passageway into the discharge chamber to be discharged from the interior region through the outlet port, wherein the valve housing has a central vertical axis, the upright interior wall is cylinder-shaped and has a central vertical axis that is coextensive with the central vertical axis of the valve housing, and the upright interior wall is formed to include the discharge chamber therein;

wherein the valve housing includes a top wall arranged to intersect the central vertical axis of the valve housing and adapted to be mounted to a top wall of a fuel tank, a bottom wall positioned to lie below and in spaced-apart relation to the top wall, an outer side wall arranged to extend from the top wall to the bottom wall to define the interior region therebetween, and the bottom wall is formed to include the outlet port at a lower end of the upright interior wall to cause fuel vapor in the discharge chamber to flow out of the interior region of the valve housing through the outlet port; and wherein the inlet port is fanned in the outer side wall of the valve housing and further comprising an interior sleeve located in the interior region of the valve housing to surround the upright interior wall and to divide the upstream passageway into an intake chamber arranged to receive liquid fuel and fuel vapor admitted into the interior region through the inlet port and a float chamber lying between the intake and discharge chambers and containing the vent port valve therein, the interior sleeve is formed to include a lower fuel port near the bottom wall to conduct liquid fuel from the intake chamber to the float chamber and an upper vapor port near the top wall to conduct fuel vapor from the intake chamber to the float chamber for delivery to the discharge chamber when the vent port valve is moved to assume the opened position.

2. The apparatus of claim 1, wherein each of the outer side wall and the interior sleeve is cylinder-shaped and has a central vertical axis that is coextensive with the central vertical axis of the valve housing.

3. A tank vent apparatus comprising a valve housing formed to include an inlet port, an outlet port, and an interior region arranged to receive fuel vapor admitted into the valve housing through the inlet port and to communicate fuel vapor to the outlet port for discharge from the valve housing, a partition located in the valve housing to divide the interior region into an upstream passageway arranged to receive liquid fuel and fuel vapor admitted into the interior region through the inlet port and a discharge chamber arranged to discharge fuel vapor from the interior region through the outlet port, the partition including an upright interior wall providing a valve seat located in the upstream passageway and fanned to include at least one vent port configured to communicate fuel vapor from the upstream passageway into the discharge chamber, a vent port valve mounted for movement in the upstream passageway in an axially upward direction to a closed position engaging the valve seat and closing the at least one vent port and in an axially downward direction to an opened position disengaging at least a portion of the valve seat and opening the vent port to allow fuel vapor to flow in a radial direction through the vent port from the upstream passageway into the discharge chamber to be discharged from the interior region through the outlet port, and a vent unit configured to provide vent means for admitting fuel vapor into the upstream passageway when liquid fuel admitted into the upstream passageway through the inlet port rises to a level in the upstream passageway to occlude the inlet port and block passage of fuel vapor therethrough so that fuel vapor continues to be admitted into the upstream passageway for delivery to the discharge chamber when the vent port valve is moved to assume the opened position.

4. The apparatus of claim 3, wherein the vent unit is positioned to lie in the upstream passageway and an inlet channel is formed in the valve housing to admit fuel vapor into the vent means provided in the vent unit.

5. The apparatus of claim 3, wherein the vent means includes a movable head valve normally at rest on a valve seat formed to include a vent passageway to close the vent passageway, the head valve is located in a valve chamber defined by a chamber wall rising up from the valve seat, the chamber wall is formed to include an opening to pass pressurized fuel vapor in the valve chamber into the upstream passageway for delivery to the discharge chamber when the vent port valve is moved to assume the opened position.

6. The apparatus of claim 5, wherein the vent means further includes a bleed passageway formed in the vent unit to meter a flow of pressurized fuel vapor from a location outside the valve housing into the valve chamber regardless of whether the head valve is positioned to open or close the vent passageway formed in the valve seat.

7. A tank vent apparatus comprising a valve housing formed to include an inlet port, an outlet port, and an interior region arranged to receive fuel vapor admitted into the valve housing through the inlet port and to communicate fuel vapor to the outlet port for discharge from the valve housing, a partition located in the valve housing to divide the interior region into an upstream passageway arranged to receive liquid fuel and fuel vapor admitted into the interior region through the inlet port and a discharge chamber arranged to discharge fuel vapor from the interior region through the outlet port, the partition including an upright interior wall providing a valve seat located in the upstream passageway and formed to include at least one vent port configured to communicate fuel vapor from the upstream passageway into the discharge chamber, a vent port valve mounted for movement in the upstream passageway in an axially upward direction to a closed position engaging the valve seat and closing the at least one vent port and in an axially downward direction to an opened position disengaging at least a portion of the valve seat and opening the vent port to allow fuel vapor to flow in a radial direction through the vent port from the upstream passageway into the discharge chamber to be discharged from the interior region through the outlet port, a remote fuel and vapor inlet unit coupled to the inlet port of the valve housing, and a transfer conduit coupled to the remote fuel and vapor inlet unit and adapted to transfer liquid fuel and fuel vapor admitted into the remote fuel and vapor inlet unit from a fuel tank containing the remote fuel and vapor inlet unit into the upstream passageway formed in the valve housing, and wherein the remote fuel and vapor inlet unit includes an inlet chamber, an inlet port communicating with the inlet chamber to admit liquid fuel and fuel vapor therein, a drain port communicating with the inlet chamber, an outlet coupled to the transfer conduit, and drain-control means for controlling opening and closing of the drain port.

8. The apparatus of claim 7, wherein the remote fuel and vapor inlet includes a floor located to provide a lower boundary of the inlet chamber and formed to include the drain port to facilitate drainage of liquid fuel from the inlet chamber and the drain-control means includes a cage that depends from the floor of the remote fuel and vapor inlet and extends around and below the drain port and a buoyant drain closure retained inside the cage and configured to float in liquid fuel admitted into the cage to move in the cage between an opened position away from the drain port to allow any residual liquid fuel in the inlet chamber to drain out of the inlet chamber through the drain port and the cage and a closed position engaging a valve seat surrounding the drain port to close the drain port.

9. A tank vent apparatus comprising a valve housing including a top wall adapted to be mounted to a top wall of a fuel tank, a bottom wall positioned to lie in spaced-apart relation to the top wall, and an outer side wall arranged to cooperate with the top and bottom walls to define an interior region, the outer side wall being formed to include an inlet port to communicate liquid fuel and fuel vapor into the interior region, the bottom wall being formed to include an outlet port to discharge fuel vapor from the interior region to a destination outside of the valve housing, and flow-control means located in the interior region of the valve housing for blocking flow of liquid fuel admitted into the interior region through the inlet port from the interior region through the outlet port and allowing flow of pressurized fuel vapor admitted into the interior region to flow from the interior region through the outlet port until liquid fuel extant in the interior region rises above the bottom wall to a level in excess of a predetermined level, wherein the flow-control means includes a cylinder-shaped interior wall coupled to the bottom wall at the outlet port and formed to define a discharge chamber to conduct fuel vapor to the outlet port formed in the bottom wall and at least one vent port configured to admit pressurized fuel vapor into the discharge chamber, the flow-control means further includes a cylinder-shaped interior sleeve positioned to lie in the interior region between the outer side wall and the cylinder-shaped interior wall and surround the cylinder-shaped interior wall to define an intake chamber arranged to receive liquid fuel and fuel vapor admitted into the interior region through the inlet port formed in the outer side wall and a float chamber located between the intake and discharge chambers and in communication with the at least one vent port formed in the cylinder-shaped interior wall, the cylinder-shaped interior sleeve is formed to include a lower fuel port near the bottom wall to conduct liquid fuel from the intake chamber to the float chamber and an upper vapor port near the top wall to conduct fuel vapor from the intake chamber to the float chamber, and the flow-control means further includes a vent port valve mounted for movement in the float chamber to open and close the at least one vent port to regulate flow of pressurized fuel vapor from the float chamber into the discharge chamber through the at least one vent port.

10. The apparatus of claim 9, wherein the vent port valve includes a float and a seal positioned to lie between the float and the top wall of the valve housing and coupled to the float to move therewith to close the at least one vent port upon movement of the vent port valve in the float chamber toward the top wall of the valve housing to a closed position and to open the at least one vent port upon movement of the vent port valve in the float chamber toward the bottom wall of the valve housing.

11. The apparatus of claim 10, wherein the seal includes a base coupled to the float, a lip coupled to the interior wall at a location between the at least one vent port and the bottom wall, and a pliable annular membrane arranged to interconnect the base and the lip and configured to surround a portion of the cylinder-shaped interior wall and to roll back and forth relative to the portion of the cylinder-shaped interior wall and the at least one vent port formed therein as the float is raised and lowered in a rising and falling pool of liquid fuel extant in the float chamber to close the at least one vent port upon movement of the vent port valve in the float chamber to the closed position.

12. The apparatus of claim 9, wherein the valve housing includes a central vertical axis extending through the top and bottom walls and each of the cylinder-shaped interior wall, interior sleeve, and outer side wall has a central vertical axis that is coextensive with the central vertical axis of the valve housing.

13. A tank vent apparatus comprising
a valve housing including a top wall adapted to be mounted to a top wall of a fuel tank, a bottom wall positioned to lie in spaced-apart relation to the top wall, and an outer side wall arranged to cooperate with the top and bottom walls to define an interior region, the outer side wall being formed to include an inlet port to communicate liquid fuel and fuel vapor into the interior region, the bottom wall being formed to include an outlet port to discharge fuel vapor from the interior region to a destination outside of the valve housing,
flow-control means located in the interior region of the valve housing for blocking flow of liquid fuel admitted into the interior region through the inlet port from the interior region through the outlet port and allowing flow of pressurized fuel vapor admitted into the interior region to flow from the interior region through the outlet port until liquid fuel extant in the interior region rises above the bottom wall to a level in excess of a predetermined level, and
a remote fuel and vapor inlet unit and a transfer conduit coupled to the remote fuel and vapor inlet unit and adapted to transfer liquid fuel and fuel vapor admitted into the remote fuel and vapor inlet unit from a fuel tank containing the remote fuel and vapor inlet unit into the interior region formed in the valve housing, the remote fuel and vapor inlet unit includes an inlet chamber, an inlet port communicating with the inlet chamber to admit liquid fuel and fuel vapor therein, a drain port communicating with the inlet chamber, an outlet coupled to the transfer conduit, and drain-control means for controlling opening and closing of the drain port.

14. The apparatus of claim 13, wherein remote fuel and vapor inlet includes a floor located to provide a lower boundary of the inlet chamber and formed to include the drain port to facilitate drainage of liquid fuel from the inlet chamber and the drain-control means includes a cage that depends from the floor of the remote fuel and vapor inlet and extends around and below the drain port and a buoyant drain closure retained inside the cage and configured to float in liquid fuel admitted into the cage to move in the cage between an opened position away from the drain port to allow any residual liquid fuel in the inlet chamber to drain out of the inlet chamber through the drain port and the cage and a closed position engaging a valve seat surrounding the drain port to close the drain port.

15. A tank vent apparatus comprising
a valve housing including a top wall adapted to be mounted to a top wall of a fuel tank, a bottom wall positioned to lie in spaced-apart relation to the top wall, and an outer side wall arranged to cooperate with the top and bottom walls to define an interior region, the outer side wall being formed to include an inlet port to communicate liquid fuel and fuel vapor into the interior region, the bottom wall being formed to include an outlet port to discharge fuel vapor from the interior region to a destination outside of the valve housing, and
flow-control means located in the interior region of the valve housing for blocking flow of liquid fuel admitted into the interior region through the inlet port from the interior region through the outlet port and allowing flow of pressurized fuel vapor admitted into the interior region to flow from the interior region through the outlet port until liquid fuel extant in the interior region rises above the bottom wall to a level in excess of a predetermined level, wherein the valve housing is formed to include an inlet channel open to receive fuel vapor extant outside of the valve housing and further comprising a vent unit located in the interior region of the valve housing, the vent unit including a valve seat formed to include a vent passageway located to receive pressurized fuel vapor passing into the valve housing through the inlet channel and a chamber wall rising up from the valve seat to define a valve chamber and providing an opening to pass pressurized fuel vapor in the valve chamber into the interior region of the valve housing for delivery to the discharge chamber, the vent unit further including a movable head valve normally at rest on the valve seat to close the vent passageway and arranged to move in the valve chamber away from the valve seat to open the vent passage in response to presence of pressurized fuel vapor in the inlet channel in excess of a predetermined pressure.

16. The apparatus of claim 15, wherein the vent unit is formed to include a bleed passageway sized to meter a flow of pressurized fuel vapor from a location outside the valve housing into the valve chamber regardless of whether the head valve is positioned to open or close the vent passageway formed in the valve seat.

17. The apparatus of claim 16, wherein the valve seat is formed to include the bleed passageway and the bleed passageway has an inlet opening communicating with the inlet channel and an outlet opening communicating with the valve chamber.

18. A tank vent apparatus comprising
a valve housing including a top wall adapted to be mounted to a top wall of a fuel tank, a bottom wall positioned to lie in spaced-apart relation to the top wall, and an outer side wall arranged to cooperate with the top and bottom walls to define an interior region, the outer side wall being formed to include an inlet port to communicate liquid fuel and fuel vapor into the interior region, the bottom wall being formed to include an outlet port to discharge fuel vapor from the interior region to a destination outside of the valve housing,
a remote fuel and vapor inlet unit positioned to lie below the bottom wall of the valve housing and formed to include an inlet chamber, an inlet port communicating with the inlet chamber to admit liquid fuel and fuel vapor therein, a drain port communicating with the inlet chamber, an outlet, and drain-control means for controlling opening and closing of the drain port, and a transfer conduit coupled to the outlet of the remote fuel and vapor inlet unit and to the inlet port formed in the outer side wall of the valve housing to transfer liquid fuel and fuel vapor admitted into the remote fuel and vapor inlet unit through the inlet port formed therein into the interior region of the valve housing through the inlet port formed in the outer side wall of the valve housing.

19. The apparatus of claim 18, wherein the remote fuel and vapor inlet includes a floor located to provide a lower boundary of the inlet chamber and formed to include the drain port to facilitate drainage of liquid fuel from the inlet chamber and the drain-control means includes a cage that depends from the floor of the remote fuel and vapor inlet and extends around and below the drain port and a buoyant drain closure retained inside the cage and configured to float in liquid fuel admitted into the cage to move in the cage between an opened position away from the drain port to allow any residual liquid fuel in the inlet chamber to drain out of the inlet chamber through the drain port and the cage and a closed position engaging a valve seat surrounding the drain port to close the drain port.

* * * * *